(12) United States Patent
Streetman

(10) Patent No.: US 6,537,018 B2
(45) Date of Patent: Mar. 25, 2003

(54) ROTATIONAL POWER TRANSFER DEVICE

(76) Inventor: Foy Streetman, 401 Chickasha Ave., Chickasha, OK (US) 73023

( * ) Notice: Subject to any disclaimer, the term of this patent is extended or adjusted under 35 U.S.C. 154(b) by 0 days.

(21) Appl. No.: 09/876,634

(22) Filed: Jun. 7, 2001

(65) Prior Publication Data

US 2002/0187038 A1 Dec. 12, 2002

(51) Int. Cl.⁷ .................................................. F03D 7/00
(52) U.S. Cl. ........................ 415/3.1; 415/4.2; 415/907; 416/110; 290/44
(58) Field of Search .................... 415/3.1, 4.2, 4.4, 415/907; 416/110; 290/44, 55

(56) References Cited

U.S. PATENT DOCUMENTS

| | | | | |
|---|---|---|---|---|
| 1,111,350 A | * | 9/1914 | Bayley | |
| 4,346,305 A | * | 8/1982 | White | 290/55 |
| 4,684,817 A | * | 8/1987 | Goldwater | 290/43 |
| 6,109,863 A | * | 8/2000 | Milliken | 415/1 |
| 6,327,994 B1 | * | 12/2001 | Labrador | 114/382 |

* cited by examiner

Primary Examiner—Edward K. Look
Assistant Examiner—James M McAleenan
(74) Attorney, Agent, or Firm—R. William Graham

(57) ABSTRACT

A rotational power transfer device includes a rotatable shaft, a plurality of arm structures attached to the shaft and extending radially outward from the shaft, a plurality of pin structures attached to and extending radially outward from the shaft such that the arm structures and the pin structures are aligned, a plurality of panel members attached to the arm structures and hanging downward therefrom, and an energy converting member for converting energy to electricity.

17 Claims, 6 Drawing Sheets

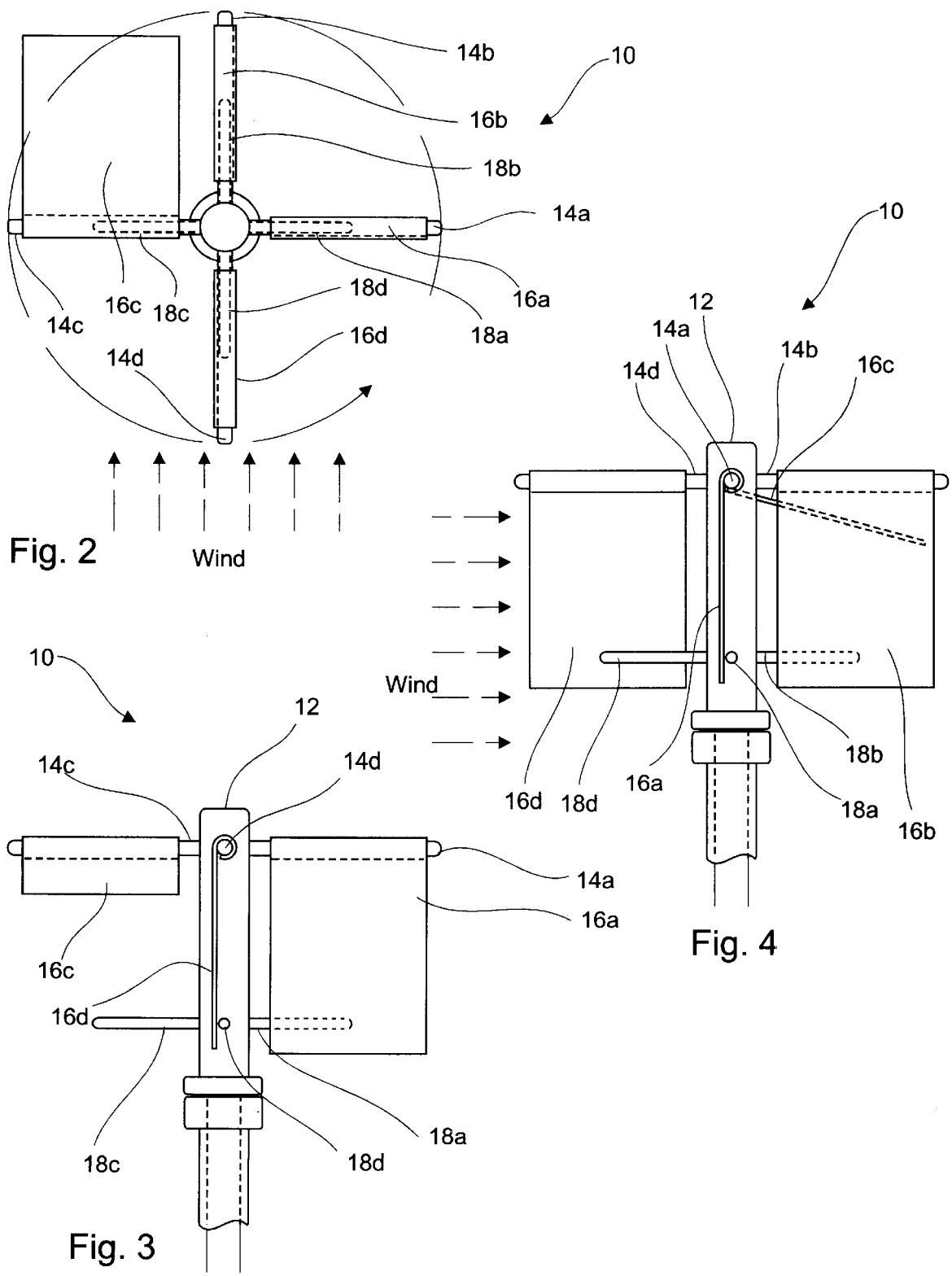

ROTATIONAL POWER TRANSFER DEVICE

BACKGROUND OF THE INVENTION

1. Field of the Invention

The present invention relates to the field of natural energy. More particularly, the invention relates to a device for producing power in an environment where any form of natural motion exists.

2. Prior Art

There exist numerous types of natural energy driven devices. In the field of wind driven devices, the most common type of device is the windmill. Windmills typically include a plurality of blades or foils and operate on a principle by which air current forces rotation of the blades when properly disposed into the wind current. Here lies a basic flaw in windmills. Particularly, they must be directed into the wind current in order to operate. Some windmills have utilized tails in order to orient the blades into the wind current. However, these designs require a relatively significant amount of wind in order to achieve proper orientation and operation.

Also, wind turbine machines of various design have been previously proposed for use in converting wind energy to electrical energy. Machines of the type utilizing a plurality of exposed blades rotating about a horizontal axis are in commercial use in a number of different locations. Many such designs lack sufficient integrity under heavy wind conditions.

Prior wind turbines typically utilize a rotor which is rotatable about a vertical axis. The rotor normally includes a plurality of blades. Also, pluralities of stationary wind deflectors or wind-directing blades have been used around the rotor to deflect air toward the rotor blades. The typical wind deflectors are generally planar or slightly curved devices which are vertically oriented and are positioned around the perimeter of the rotor.

Even with recent advancements, there is still a continuing need to improve the manner in which wind and other natural motion forces are harvested as a natural resource. It is desired that there be a rotational power transfer device which operates without requiring orientation of the device to face an existing prevailing wind current and which is safely operably disposable in severe wind conditions. Accordingly, the present invention provides such a system.

BRIEF SUMMARY OF THE INVENTION

The present invention is directed to a rotational power transfer device which includes a shaft and a plurality of arms positioned equally around the shaft and extending outwardly from the center-rotating shaft to keep the center-rotating shaft balanced during rotation, particularly at high speeds. In a preferred aspect of the invention, the center-rotating shaft is oriented in a vertical position and the outwardly extending arms are positioned 90 degrees in a perpendicular relationship with respect to the center-rotating shaft. Each of the outwardly extending arms further includes a lightweight flap-like material or panel member hanging downwardly from the arms so that they are able to swing freely in one direction upon exertion of pressure. The center-rotating shaft also includes a plurality of pins protruding outwardly from the shaft. The number of pins is equal to the number of arms and such pins are oriented in a parallel alignment with the arms. Each pin is located a distance from the corresponding arm such that the panel member hanging downwardly from each arm rests against the corresponding pin.

The only two moving parts of the rotational power transfer device of this invention are the panel members and the rotating shaft. The shaft moves in relation to what the design mechanics dictate, and is based on the pins being on the same side of the panel members to prevent at least on of the panel members from swinging upward when subjected to a force delivered by wind or other natural or unnatural motion. Natural motion is intended to include winds, breezes, currents, tides, gravity, magnetic forces, etc. Unnatural motion is intended to include motions subject to influence by man, such as the flow of fluids and gases through pipes, from a reservoir, or the like. For example, expanding gas as it is being produced from a gas well is a potential generator to power the rotational power transfer device of the invention.

In response to the force of the motion, most of the panel members, and particularly the panel member on the side opposite the at least one panel member which is prevented from swinging upward, swings freely because the pin is on the same side of the panel member as the wind force. The rotational power transfer device will respond to any motion present in precisely the same way whether the motion force is wind, fluid flow, gravity, magnetic forces, or other such forces.

The direction of the wind is immaterial because the device will always have at least one side where the pin catches the panel member to retain it in a vertical position and, therefor will always transfer the energy to the rotating shaft, while the panel member of the opposite side of the device does not resist the wind force and, accordingly, is free to swing upward in response to the motion force where it becomes oriented in the motion force direction. As the rotational shaft rotates on its axis, each of the panel members in a sequential manner is caught by its corresponding pin causing the motion to apply a rotating force thereon. The rotating shaft can be directly connected to, or attached, by power transfer devices, to a compressor, generator, or other form of energy converting devices for further use.

Accordingly, the invention is directed to a rotational power transfer device. The device includes a rotatable shaft having a first end and a second end. A housing is provided having a first open end and a second open end, wherein the open ends are configured to form a path to receive fluid flow through the housing. The shaft is operably disposed in a position transverse to the path having the first end rotatably connected to the housing and a second end rotatably connected to the housing and a remainder of the housing substantially containing the fluid path about the shaft.

A plurality of arm structures are attached to and positioned equally around the rotatable shaft, the plurality of arm structures extending radially outward from an upper portion of the rotatable shaft. A plurality of pin structures are attached to and positioned equally around the shaft, the plurality of pin structures extending radially outward from a lower portion of the shaft. A plurality of panel members are included, wherein each panel member of the plurality of panel members is attached to a corresponding arm structure such that the panel member hangs downwardly from the corresponding arm structure, and wherein the panel members extend below the pin structures such that each pin structure of the plurality of pin structures is oriented in such a manner that one of the panel members is prevented from swinging in the direction of a pressure flow applied thereto from the fluid flow and an opposing panel member is not prevented from swinging in the direction of said motion force applied thereto, the force applying a rotating force on the device. Further, a screen is connected adjacent the first end and is configured to prevent debris from entering without substantially affecting fluid flow thereby. An energy converter is attached to the shaft of the device for converting energy provided thereby to electricity.

Other objects and advantages will be readily apparent to those persons skilled in the art upon viewing the drawings and reading the detailed description.

BRIEF DESCRIPTION OF THE DRAWINGS

FIG. 2 is a top of the rotational power transfer device of the invention;

FIG. 3 is a side view of the rotational power transfer device of the invention;

FIG. 4 is another side view of the rotational power transfer device of the invention wherein the device is rotated 90 degrees;

DETAILED DESCRIPTION OF THE INVENTION

It is an object of the present invention to provide a novel energy producing device.

It is another object of the invention to provide an energy producing device which has a power output which is greater than the prior art wind turbine devices.

It is yet another object of the invention to provide a novel energy producing device which is operable in any environment where natural motion exists.

Accordingly, the present invention is directed to a rotational power transfer device which meets these objectives.

For the purpose of this invention, the term "wind" is generally used to describe the motion force applied to the device unless otherwise stated. However, it will be recognized that any form of motion force, natural or unnatural may be utilized to power the device.

Figure 1:
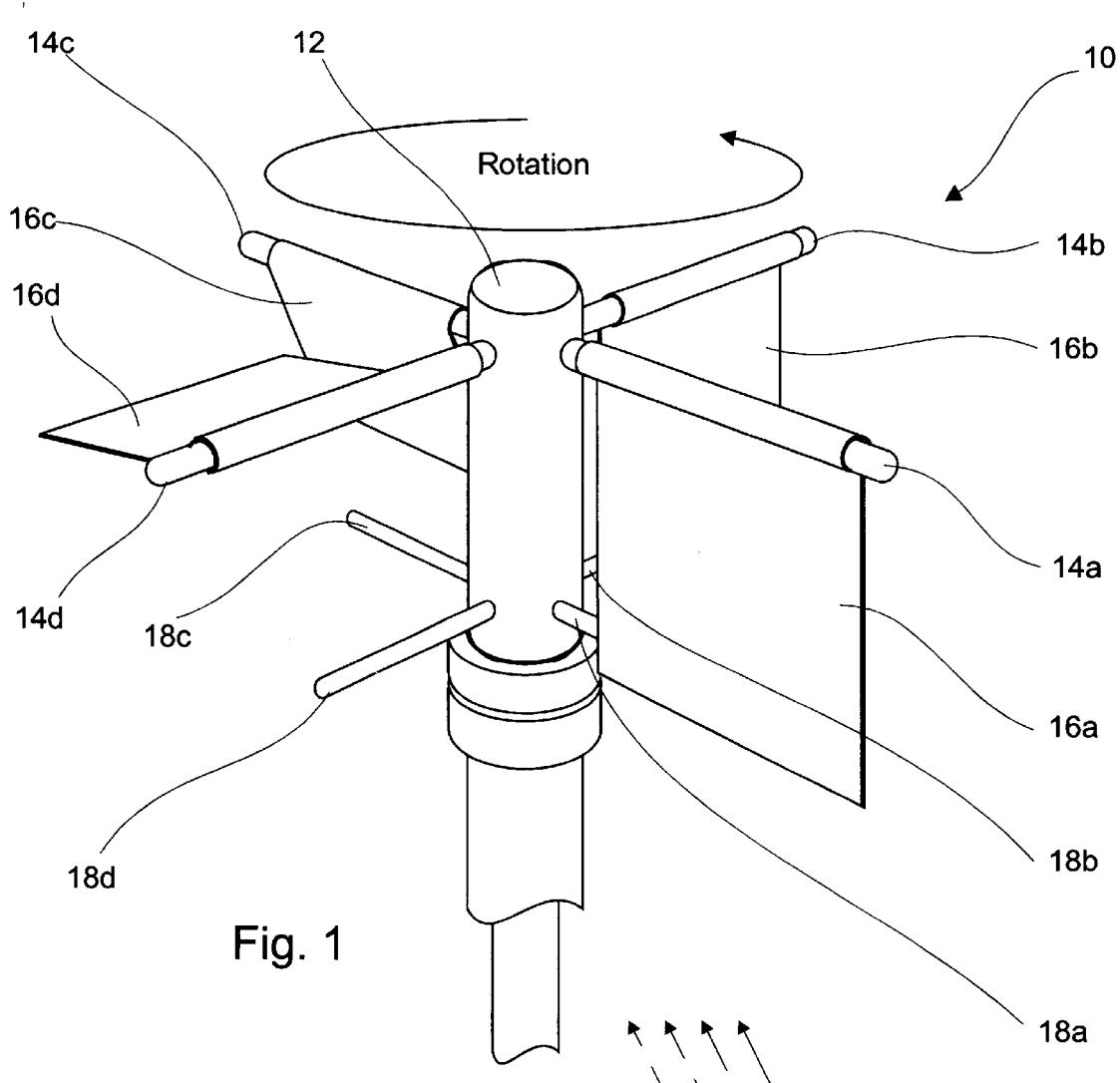
FIG. 1 is a perspective view of a rotational power transfer device of the invention.
Figure 1A:
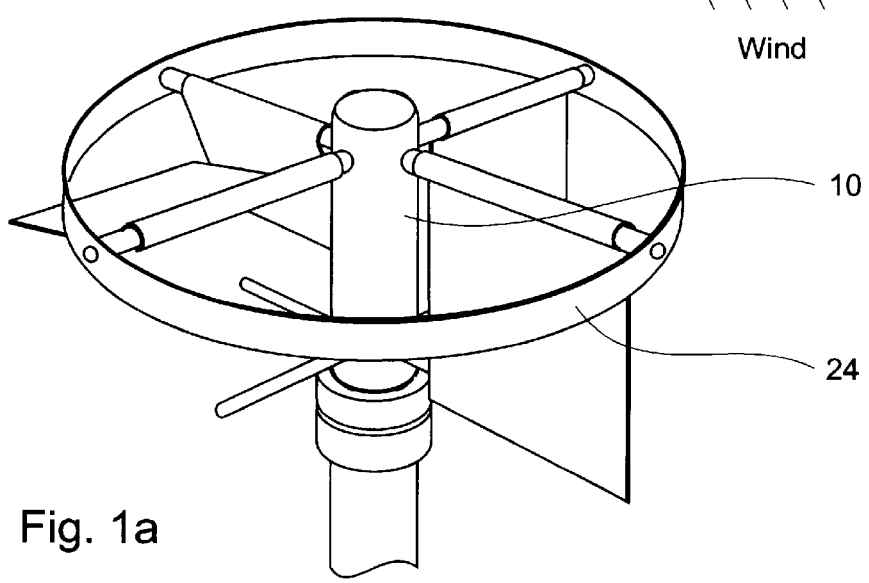
FIG. 1a is perspective view of another embodiment of the rotational power transfer device of the invention.

Referring now to the drawings, a rotational power transfer device 10 of the present invention is shown in FIGS. 1–12 which illustrates several embodiments of the present invention as set forth herewith. In FIGS. 1–6 and 10, the rotational power transfer device 10 described herein is shown here as comprising a vertically disposed shaft 12 having a plurality of arms 14a–d extending radially from the shaft 12. Any number of sets of arms, panels and pins (one set includes one arm, one corresponding panel and one corresponding pin) may be employed. For the purpose of illustration, the device is shown as having four sets of arms, panels and pins. The arms 14a–d extend outwardly in a horizontal plane wherein the arms are equidistance apart. Each arm has a corresponding panel member 16a–d longitudinally attached to the respective arm 14a–d. Typically, the panel members 16a–d are constructed from a rigid plastic or lightweight metal, e.g., aluminum. In some instances where the motion force is a strong current or wind, the arms, pins and panel members may be constructed of a more substantial material which can withstand the strong current or wind. For example, where the device is used in a pipeline or in a river where the flow of fluid provides a substantial force on the device, heavier materials may be employed. In addition, the panel member may have a plurality of reinforcement ridges (not shown) running parallel to the shaft in order to prevent the panel member from buckling. To add further strength to the device, a thin circular outer ring 24 (FIG. 1a) may be used to connect the outer ends of the arm structures 14a–d together. This would reduce the chance of the arms 14a–d bending or being displaced by surges in the motion force without requiring the arm structures to be made of heavy materials.

The panel members 16a–d are securely attached to the respective arm structures 14a–d. For example, the panel members 16a–d may be wrapped around the corresponding arm structure, or hinged thereto, or attached by any other means which would allow the panel members 16a–d to swing freely from the corresponding arm structure. The panel members 16a–d are spaced apart a short distance from the shaft 12 to prevent any contact between the panel members 16a–d and the shaft 12. The shaft 12 further includes a plurality of pin structures 18a–d protruding outwardly from the shaft 12 in a perpendicular plane. The number of pins present on the shaft is equal to the number of arms present. The pins 18a–d are vertically aligned with the corresponding arms 14a–d and should have an approximate length equal to that of the arms. The pins 18a–d are typically constructed of a lightweight material such as that used to construct the arms 14a–d. In accordance with the invention, each pin structure 18a–d is located on the shaft 12 at a predetermined distance from the corresponding arm structure 14a–d so that each panel member rests against a corresponding pin in one direction. This arrangement allows at least one of the panel members to act as a sail and catch the wind to rotate the device while at least one of the opposing panel members is free to swing in the direction of the wind. For example, pins 18a–d are all on the same side of the respective panel members 16a–d and as the wind impinges on the device 10, panel member 16a is prevented from swinging upward while panel members 16b and 16d are neutral, i.e., panel members 16b and 16d are not influenced by the force of the wind, and panel member 16c which is directly opposite panel member 16a is able to swing freely in the direction of the wind. As illustrated in FIG. 2, the wind impinges on panel member 16a which is prevented from swinging upward because it is resting against pin 18a. Panel members 16b and 16d are parallel to the direction of the wind and, therefor, are not affected by the force of the wind. Panel member 16c, on the other hand, is affected by the wind and since the pin 18c is now on the wind receiving side of panel member 16c, the panel member swings upward in response to the force of the wind. In this position, panel member 16c offers essentially no resistance to the wind which results in the wind force on panel member 16a, which acts as a sail to catch the wind, to be particularly effective in causing the device 10 to rotate counterclockwise as shown in FIG. 2.

Figure 11:
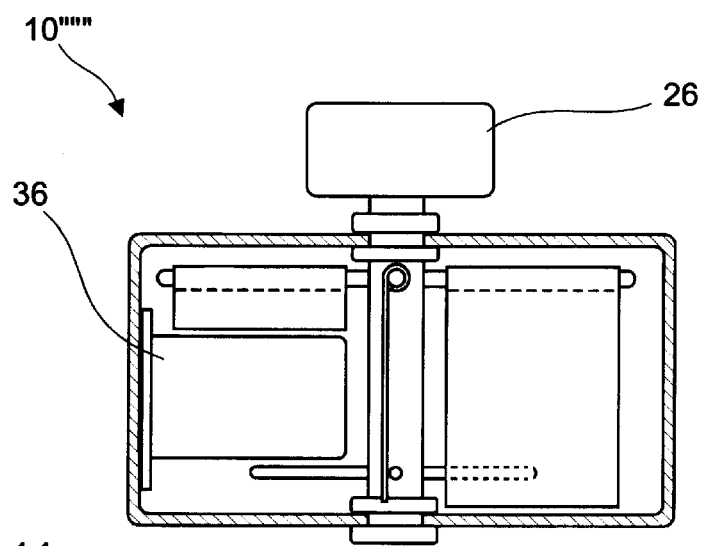
FIG. 11 is a front view of still another embodiment of the invention.
Figure 12:
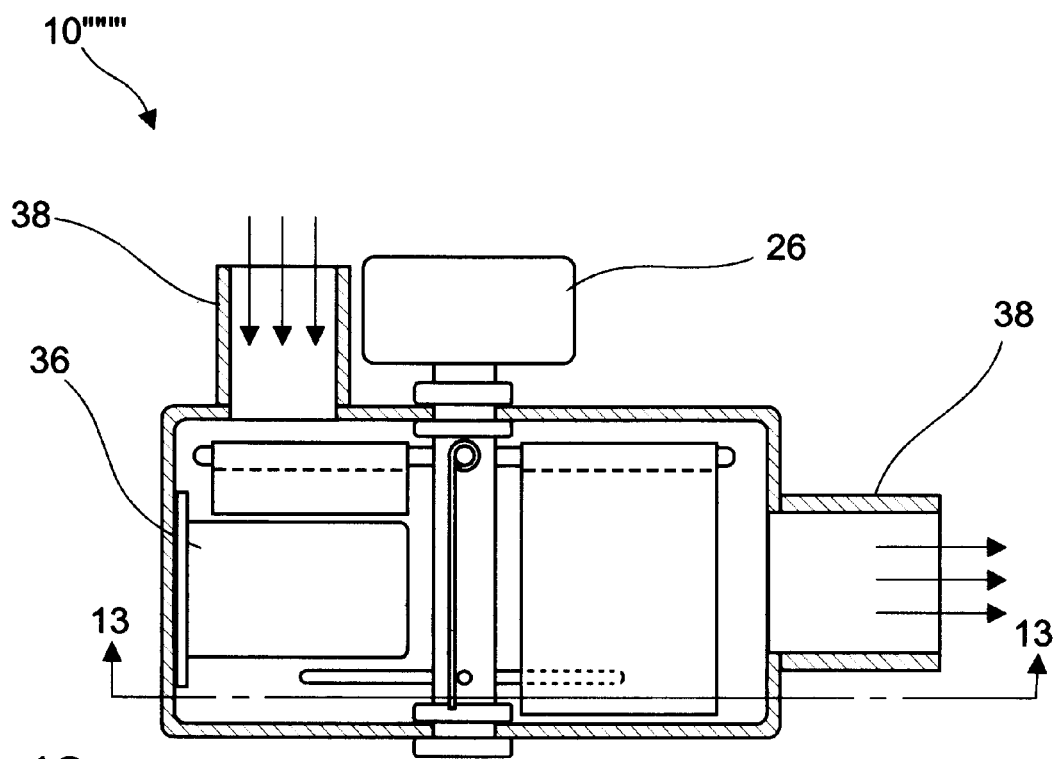
FIG. 12 is a side view of still another embodiment of the invention.
Figure 13:
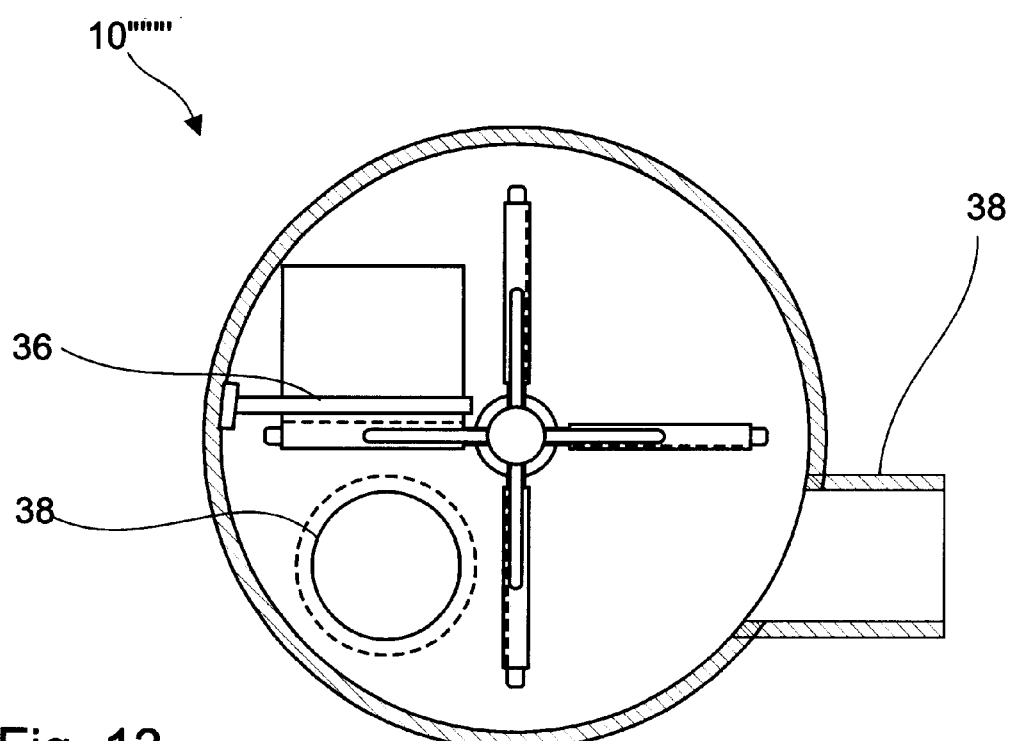
FIG. 13 is a view of the embodiment of FIG. 12 taken along line 13.

As illustrated in FIG. 11, device 10'''' includes a stationary barrier member 36 which is not attached to the rotating shaft 12. The barrier member 36 prject outward from a point of attachment 38 to form a stationary barrier which will prevent or drastically reduce the pressure flow on the felt side of the device (as viewed facing the device in the direction of the pressure flow). It is important that the barrier member 36 not be connected to the shaft 12 or to any of the rotating members since such arrangement would prevent or deter rotation of the device 10 and defeat its purpose. By having the barrier member 36 connected to a separate point of attachment 38 such as a separate arm or housing wall, the device is free to rotate while the barrier member 36 remains in a stationary position where it projects outward into the space between the arm 14 and pin 18 on the left side of the device as viewed in the direction of the pressure flow. In this embodiment, a majority of the pressure flow will be diverted to the right side of the device 10 to provide considerable more rotational drive output or force to the device 10''''. It may be desirable to employ a guide (not shown) attached to the housing or to an arm supporting the barrier member 36 to lift the barrier member 36 causing it to ride over the barrier member 36. This embodiment would be useful in as open atmospheric environment, in a closed environment such as a pipeline or in an underwater environment such as rivers, streams, oceans, etc. In still another aspect of this concept as illustrated in FIG. 12, the device 10''''' may be placed such that the pressure flow from the pipeline will enter the right side of the device from the top when viewing the device in the direction of the pressure flow. FIG. 13 is a view of the device 10''''' taken along line 13. In this arrangement, the force of the pressure flow entering the top of the device 10''''' would force the panel 16, riding over the barrier member 36, to quickly fall into place and thereby enhance the rotational efficiency of the device.

The device will operate just as effectively in a clockwise rotation by simply placing each of the pins 18a–d on opposite sides of the panel. It does not matter which direction the wind is coming from, the device works because the side on which the pin 18a catches the panel member 16a will always transfer the energy to the shaft 12, thus starting the rotation of shaft 12 while on the opposite side, pin 18c does not restrict the panel member 16c allowing the wind to lift the panel member 16c causing it to find a position where it will have the least resistance to the wind force. Furthermore, with the panel member 16c in this position, there is essentially no resistance to the rotation of the shaft 12 by the force of the wind on opposing panel member 16a. Rotation of the shaft 12 caused by the force of the wind on panel member 16a carries the panel member 16a around to a first neutral position. Continued rotation of the shaft places panel member 16a into the force of the wind and, since pin 18a is now in an opposite position relative to the direction of the wind, the panel member 16a is now influenced by the wind and is forced upward to a position perpendicular to the shaft 12 where the panel member offers essentially no resistance to the wind, and the opposing panel member 16c provides the force to rotate the device 10. As the shaft continues to rotate, gravity overcomes the ability of the wind to lift the panel member 16a and it again falls to a neutral position parallel to shaft 12. Continued rotation of the shaft 12 places the panel member 16a against pin 18a where the wind force on panel 16a again starts delivering the wind energy to shaft 12 causing rotation of the shaft. Although the figures and the discussion herein illustrate and describe the device as including four arms, four pins and four panel members, the device can contain more or less structures and members. Without the resistance of wind on the left side (FIG. 2), the energy provided by the rotation of the shaft 12 is significantly more efficient than prior art devices where the plurality of panel members continuously provide resistance to the wind. Furthermore the prior art devices require that the device must face the direction of the wind to be effective. There is no such requirement for the effective use of the device of the present invention. Since the configuration of the device is the same on all sides, the direction of the wind makes no difference with respect to the effective operation of the present invention. An exception to this may exist in the embodiment described above where the stationary barrier member 36 is employed. In such embodiment, a rotating base may be employed where one or more devices set side-by side would swivel by sensing the wind direction and move accordingly to face the wind. Also, it is within the scope of the invention to attach the barrier member 36 to an outer shaft or arm over the inner rotating shaft 12 wherein the outer shaft or arm is made to move as the wind changes direction.

The design of the rotational power transfer device of the present invention makes the device equally conducive to the use of other forms of motion forces which include, e.g., flowing streams, ocean currents, ocean waves, ocean tides, gravity fluctuations due to moving masses, magnetic pulsations, liquid or gas forces within a pipe, etc. For example, the rotational power transfer device of the present invention may be employed in an atmospheric environment, in a closed environment such as in a pipeline which transports fluids or vapors (FIG. 7), or it may be employed underwater, such as in streams, rivers, or in the ocean. For underwater use the upper shaft could be extended making it a tall platform housing to support a generator above the water surface with the unit underwater. To use the present device in a pipe or vessel for transferring power from a flowing stream, it could be sealed around the shaft allowing it to be extended out of the pipe or vessel into the atmosphere for running an external generator.

Figure 5:
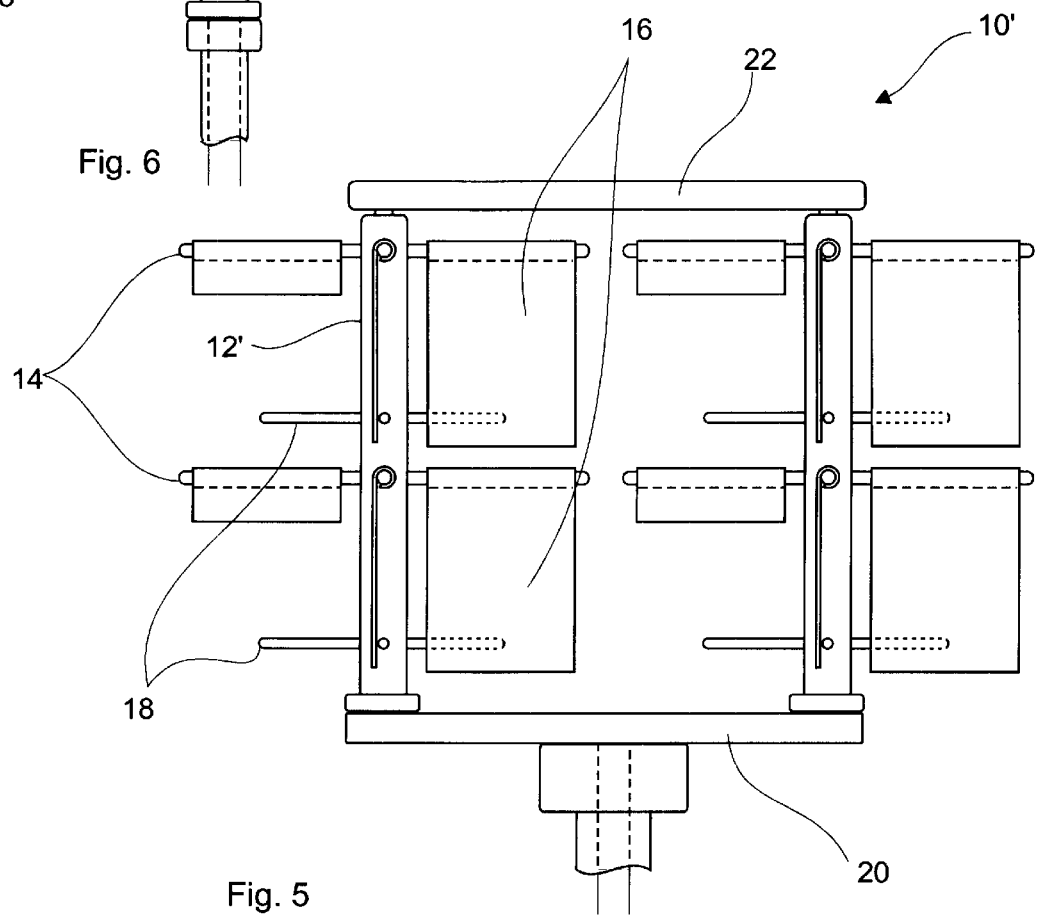
FIG. 5 is a side view of another embodiment of the invention.

FIG. 5 illustrates the use of multiple devices in a single system. For example, FIG. 5 illustrates the use of multiple members 10' in a side by side relationship. Cross member 20 supports the multiple devices and contains power transfer means for transferring the energy to a power generating unit 26 such as an electric generator, compressor or the like. Cross member 22 provides stability to the multiple devices keeping them in proper alignment. In a multiple system, the devices would have at least one direct take off pulley or gear (not shown) connecting the devices together either at the top or at the bottom.

Figure 6:
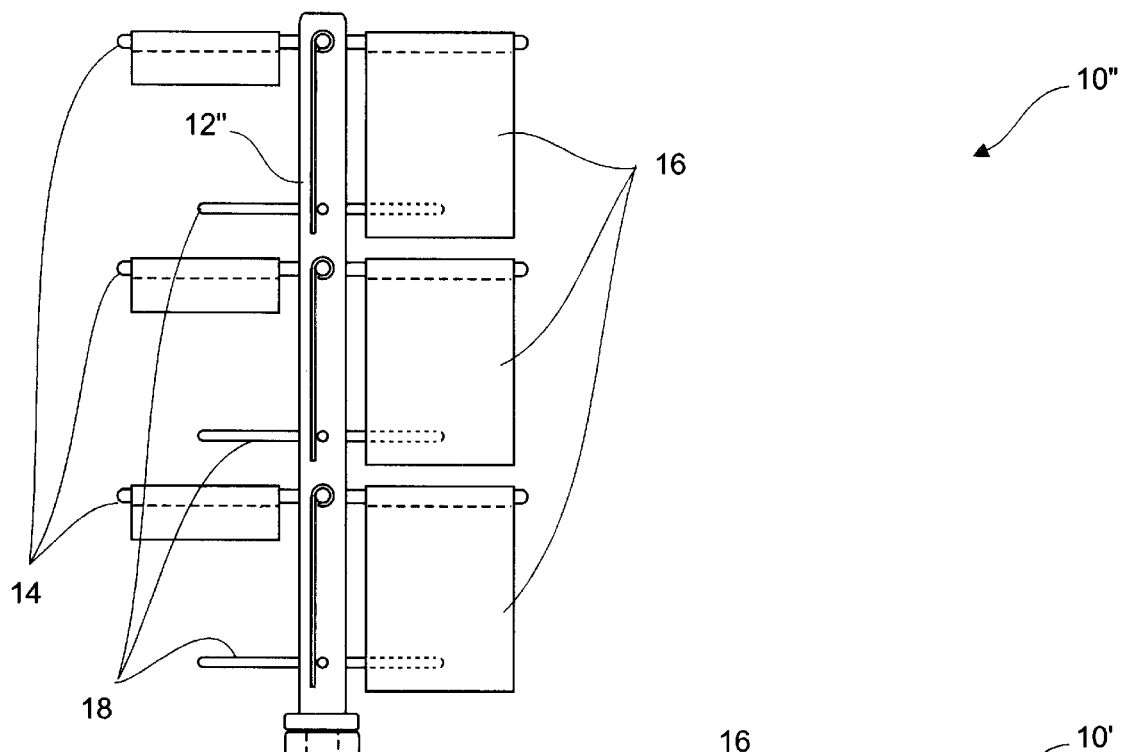
FIG. 6 is a side view of still another embodiment of the invention.

FIG. 6 illustrates another embodiment of the invention, wherein each panel member is further divided into multiple panel sections. Each of the panel sections hang downwardly and rests against a corresponding pin, in one embodiment, or against a lower arm member in an overlapping relationship, in another embodiment (FIG. 10) where the device 10''''' provides a plurality of panel members 16 in a stacked relationship. Otherwise each of the panel sections is permitted to swing freely from the corresponding arm member, to which the panel section is attached. The devices of the present invention can be combined in any number and in any configuration to provide the desired configuration. The numerals 12", 14, 16, and 18 in FIG. 6 and numerals 12', 14, 16, and 18 in FIG. 5 correspond to numerals 12, 14, 16, and 18 in FIGS. 1–4.

The shaft 12 of the rotational power transfer device 10 of the present invention can be directly connected to, or attached, by power transfer devices, to a compressor, generator, or other forms of energy converting devices for converting energy from wind or other motion force into usable electric energy, or for providing compressed air for driving existing steam turbines, e.g., to produce electricity in a conventional power station.

In one embodiment of the invention, the rotational power transfer device is employed in an open environment to harness natural wind forces. Typically, the device is employed in commercial and industrial operations to supply electrical power via a power generating unit 26 to such operations. The device can also be used to supply electricity to smaller facilities such as shops and homes.

Figure 7:
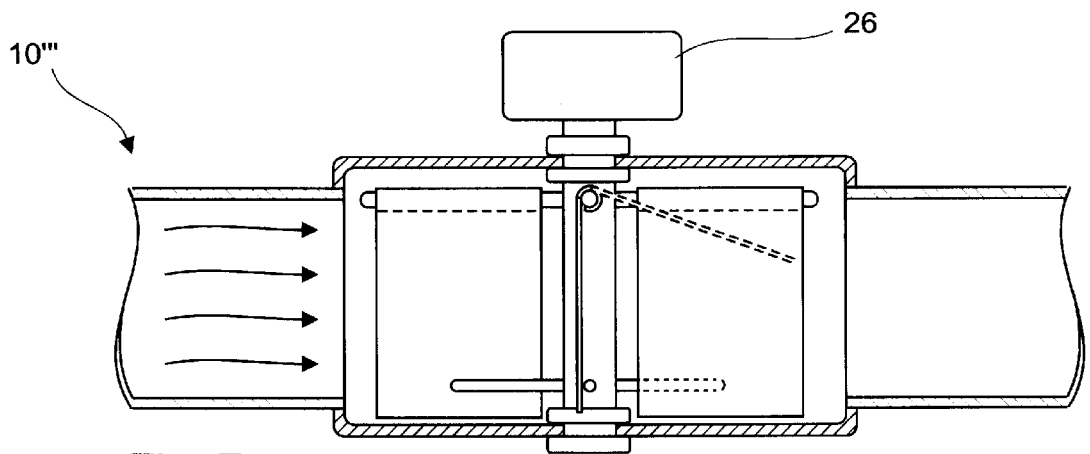
FIG. 7 is a partial cutaway view of a pipe or tube, wherein the rotational power transfer device of the invention is employed therein.

In another embodiment of the invention, one or more of the rotational power transfer devices 10′″ may be employed in a closed environment to take advantage of flowing fluids or gases, e. g., in a pipeline as illustrated in FIG. 7, such as a crude oil line, gas line or water line. In one aspect of this embodiment, the rotating power transfer device would be housed in a separate unit 28 which may be connected to the pipeline at any point along the pipeline. Any number of such units, each unit containing a rotational power transfer device may be employed along a pipeline. The unit(s) may have a boxlike shape defining the exterior and/or the interior of the unit. Typically, the rotational power transfer device will conform to the interior shape of the unit to provide maximum efficiency. In another aspect of this embodiment, the unit may have a cylindrical shape equal to that of the pipeline, or the diameter of the unit may be smaller or larger than that of the pipeline. Typically, where the unit is cylindrical, as opposed to where the unit is rectangular or square, the rotational power transfer device is on a smaller scale in order to operate within the cylindrical walls of the unit. Alternatively. The panel members of the rotational power transfer device may be curved in a manner such that the panel members will fit the curvature of the inside wall of the cylindrical unit. In any case, the rotating shaft would be sealed around the shaft allowing the rotating shaft to extend out of the unit and into the atmosphere for powering an external generator or compressor.

Figure 8:
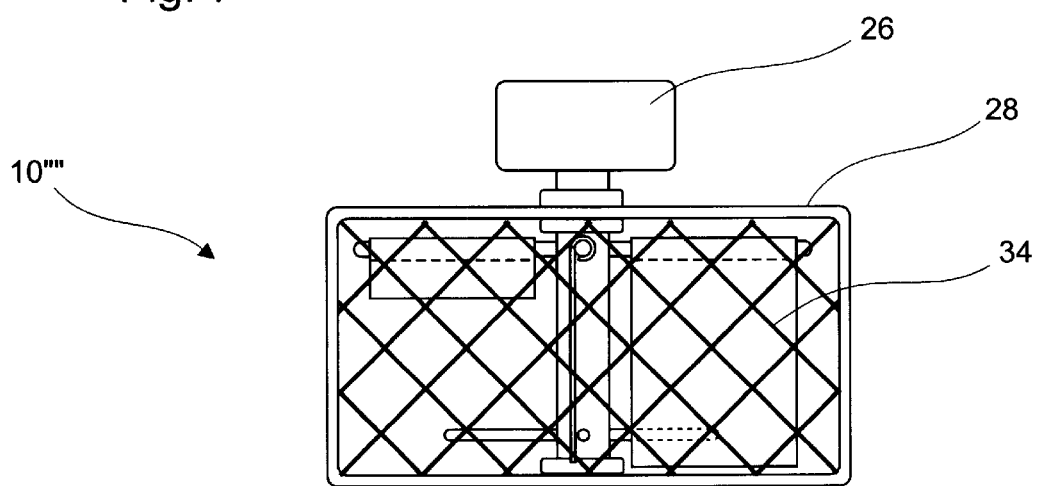
FIG. 8 is a side view of another embodiment of the invention.

In still another embodiment of the invention, one or more of the rotational power transfer devices 10″″ (FIG. 8) may be employed in an underwater environment to harness energy provided by flowing water, such as streams and rivers, particularly in rapids where the flowing water provides considerable energy which is easily harvested in accordance with the present invention. Typically, each of the devices would be contained in a frame or cage setting on a cement base or attached to an anchor to hold the device in place. Also anticipated as a source of energy is the oceans where currents, tides and wave motion provide an immense source of untaped energy. Typically, the rotational power transfer device of the invention would be placed under the water with the rotating shaft protruding up through the surface. Particularly advantageous in the embodiment is the use of a cage 28, as illustrated in FIG. 8, to house the rotational power transfer device. Typically, the cage has a non corrosive frame with open mesh surfaces 34 on at least two sides, which allows the water to flow through the cage. In one aspect of this embodiment, the device uses an underwater hydraulic power take off unit to transfer hydraulic pressure to the surface where it drives a power generating unit 28, such as a generator or compressor without requiring other extraneous mechanical drives to perform this function.

Figure 9:
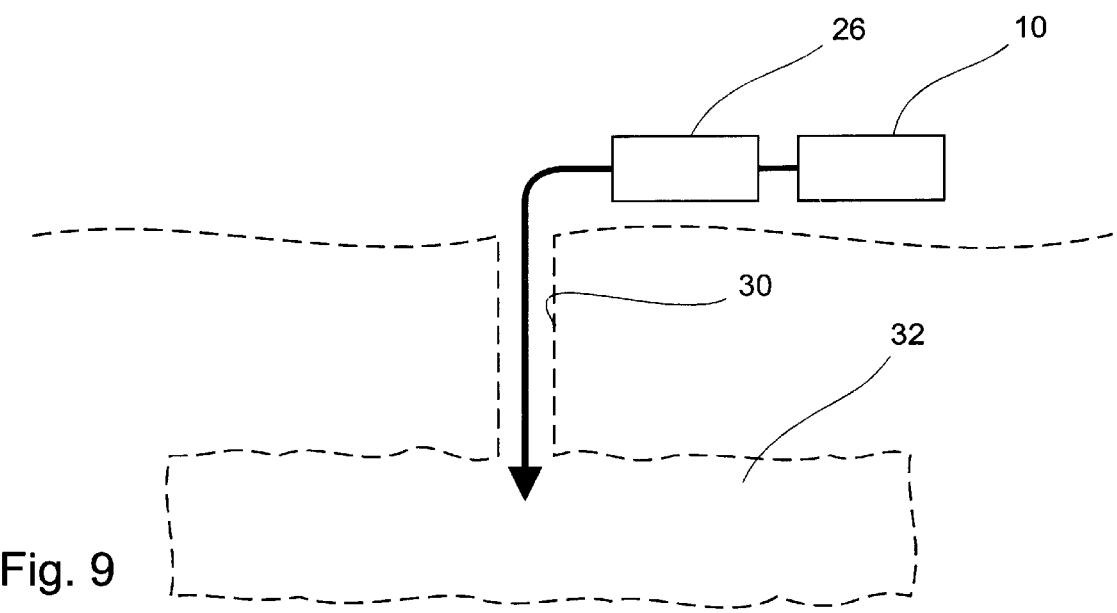
FIG. 9 is a schematic view of a depleted well formation employing the rotational power transfer device of the invention.
Figure 10:
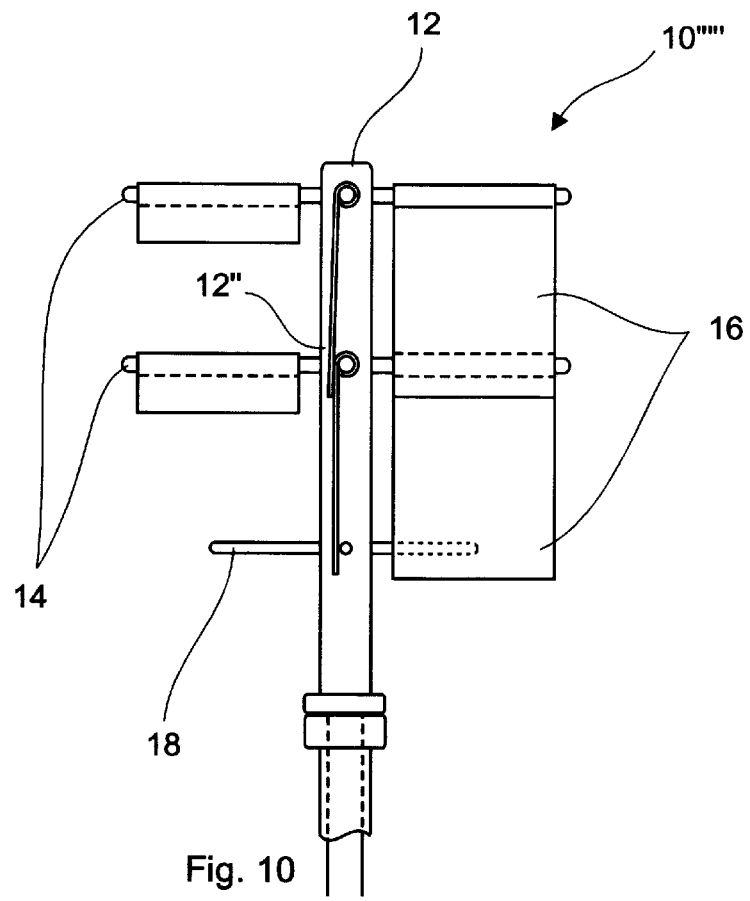
FIG. 10 is a front view of yet another embodiment of the invention.

In accordance with the present invention, a rotational power transfer device 10 employed in the above specific embodiments, as well as embodiments not particularly specified, can be utilized to pump gas or air to a reservoir 32 via a wellbore 30, where the gas or air can be stored in depleted reservoir 32 until needed, as illustrated in FIG. 9. Presently, there are numerous depleted oil wells which could serve as reservoirs to receive the gaseous materials. The wells would be sealed until a need arises to tap the energy of the stored gas or air.

The above described embodiments are set forth by way of drawings and discussion and are not for the purpose of limiting the present invention. It will be readily apparent to those persons skilled in the art that obvious modification, derivations and variations can be made to the embodiments without departing from the scope of the invention. Accordingly, the claims appended hereto should be read in their full scope including any such modifications, derivations and variations.

What is claimed is:

1. A rotational power transfer device comprising:
a rotatable shaft having a first end and a second end;
a housing having a first open end and a second open end, wherein said open ends are configured to form a path to receive fluid flow through said housing, said shaft operably disposed in a position transverse to said path having said first end rotatably connected to said housing and a second end rotatably connected to said housing and a remainder of said housing substantially containing said fluid path about said shaft;
a plurality of arm structures attached to and positioned equally around said rotatable shaft, said plurality of arm structures extending radially outward from an upper portion of said rotatable shaft; a plurality of pin structures attached to and positioned equally around said shaft, said plurality of pin structures extending radially outward from a lower portion of said shaft;
a plurality of panel members, wherein each panel member of said plurality of panel members is attached to a corresponding arm structure such that said panel member hangs downwardly from said corresponding arm structure, and wherein said panel members extend below said pin structures such that each pin structure of said plurality of pin structures is oriented in such a manner that one of said panel members is prevented from swinging in the direction of a pressure flow applied thereto from said fluid flow and an opposing panel member is not prevented from swinging in the direction of said motion force applied thereto, the force applying a rotating force on said device;
a screen connected adjacent said first end an configured to prevent debris from entering without substantially affecting fluid flow thereby; and
energy converting means attached to said shaft of said device for converting energy provided thereby to electricity.

2. The device of claim 1, wherein said device includes an equal number of arm structures, pin structures and panel structures.

3. The device of claim 1, wherein said pressure flow is wind force.

4. The device of claim 1, wherein said energy converting means is a generator or a compressor.

5. The device of claim 1, further comprising an outer ring attached to a distal end of each of said plurality of arm structures to stabilize and support said plurality of arm structures.

6. The device of claim 1, further comprising a frame member extending around said device to provide structural stability thereto.

7. The device of claim 1, wherein a plurality of devices are constructed in a side by side orientation.

8. The device of claim 1, wherein each of said panel members further includes a plurality of panel sections spaced apart along a longitudinal axis of said shaft and oriented in a parallel relationship perpendicular to said shaft.

9. The device of claim 1, wherein the device is employed in an open atmospheric environment and said pressure flow is wind.

10. The device of claim 1, wherein the device is employed in a closed structural environment and said pressure flow is fluid flow or gas flow.

11. The device of claim 10, wherein said device is housed in a unit secured in a pipeline.

12. The device of claim 11, wherein said pressure flow enters said device from the top of the device, wherein said pressure flow forces said swinging panel downward.

13. The device of claim 1, wherein the device is employed in an underwater environment.

14. The device of claim 12, wherein said device is housed in a cage.

15. The cage of claim 14, wherein said cage is an open cage which allows fluid flow there through.

16. The device of claim 1, wherein the panel members include a plurality of ridged reinforcing strips on at least one surface thereof to provide structural integrity to said panel members.

17. The device of claim 1, wherein said device is useful for pumping fluid or gas into a reservoir, said reservoir being sealed to store said fluid or gas.

* * * * *